(12) United States Patent
Linderman

(10) Patent No.: US 8,280,169 B2
(45) Date of Patent: Oct. 2, 2012

(54) RECORDATION OF HANDWRITING AND HAND MOVEMENT USING ELECTROMYOGRAPHY

(76) Inventor: Michael Linderman, Ottawa (CA)

(*) Notice: Subject to any disclaimer, the term of this patent is extended or adjusted under 35 U.S.C. 154(b) by 1032 days.

(21) Appl. No.: 11/640,954

(22) Filed: Dec. 19, 2006

(65) Prior Publication Data

US 2007/0140562 A1 Jun. 21, 2007

Related U.S. Application Data

(60) Provisional application No. 60/751,905, filed on Dec. 21, 2005.

(51) Int. Cl.
G06K 9/00 (2006.01)
(52) U.S. Cl. .................... 382/187; 382/118; 382/100
(58) Field of Classification Search .............. 382/186, 382/187
See application file for complete search history.

(56) References Cited

U.S. PATENT DOCUMENTS

| | | | |
|---|---|---|---|
| 4,715,004 A | 12/1987 | Kabasawa et al. | |
| 4,771,268 A | 9/1988 | Sone et al. | |
| 6,589,171 B2 | 7/2003 | Keirsbilck | |
| 6,677,932 B1* | 1/2004 | Westerman | 345/173 |
| 6,720,984 B1 | 4/2004 | Jorgensen et al. | |
| 2003/0009087 A1 | 1/2003 | Keirsbilck | |
| 2003/0083596 A1* | 5/2003 | Kramer et al. | 600/595 |
| 2003/0088385 A1* | 5/2003 | David | 702/189 |

OTHER PUBLICATIONS

Ruesch, Jurgen et al., "The Electromyogram of Handwriting", Psychosomatic Medicine, Oct. 1940, pp. 411-437, vol. 11, No. 4.
Benrejeb, Mohamed et al., "On modelling of the handwriting process", 17th IMACS world congress on scientific computation, applied mathematics and simulation : Paris, France, Jul. 11-15, 2005, pp. 2193-2196.
Kosaku, T. et al, "Direct Linear Models from Forearm Electromyographic Signals to en-Tip Movement in Handwriting Process", 17th IMACS world congress on scientific computation, applied mathematics and simulation : Paris, France, Jul. 11-15, 2005.
Benrejeb, Mohamed et al., "Handwriting Process Controlled by Neural and Neuro-Fuzzy IMC Approaches", International Symposium on Computational Intelligence and Intelligent Informatics 2003, May 19-23, 2003, pp. 16-20, Nabeul Tunisia.
Lansari, Azzedine et al., "A Novel Electromyography (EMG) Based Classification Approach for Arabic Handwriting", College of Information Systems, Zayed University, Jul. 2003, pp. 2193-2197, Abu Dhabi, UAE.
Lansari, Azzedine et al., "A Novel Electromyography (EMG) Based Classification Approach for Arabic Handwriting", Neural Networks, 2003, Proceedings of the International Joint Conference on Neural Networks 2003, pp. 2193-2196, Abu Dhabi, UAE.
Bouslama, Faouzi, "Exploring the Human Handwriting Process", International Journal of Applied Mathematics and Computer Science, 2000, pp. 877-904, vol. 10, No. 4.
Jiang, M.W. et al., "A Method of Recognizing Finger Motion Using Wavelet Transform of Surface EMB Signal", Engineering in Medicine and Biology 27th Annual Conference, Sep. 1-4, 2005, Shanghai, China, pp. 2672-2674, IEEE.

(Continued)

*Primary Examiner* — Hadi Akhavannik

(57) ABSTRACT

Handwriting activity is recorded by use of electromyography (EMG) signals detected from muscles at several locations on the hand. The EMG signals are sensed and registered. The sensed signals are processed and stored, after which the signals are analyzed to reconstruct handwriting activity into a digital format. Machine edible text is generated and displayed along with a graphical depiction of the handwriting.

11 Claims, 2 Drawing Sheets

OTHER PUBLICATIONS

Zecca, M. et al., "Control of Multifunctional Prosthetic Hands by Processing the Electromyographic Symbol", Critical Reviews in Biomedical Engineering, 2002, pp. 459-485, vol. 30, No. 4-6, Begel House, Inc.

Disselhorst-Klug, C. et al., "Non-invasive approach of motor unit recording during muscle contractions in humans", European Journal of Applied Physiology, 2000, pp. 144-150, vol. 83.

Schieber, Marc H., "Muscular Production of Individuated Finger Movements: The Roles of Extrinsic Finger Muscles", Journal of Neuroscience, Jan. 1995, pp. 284-297, vol. 15, No. 1.

Strang, Christina et al., "Handwriting in the Early Detection of Disease (Additional Data)", 2007, Chippenham and Bournemouth, UK.

Strang, Christina et al., "Handwriting in the Early Detection of Disease", 2007, Chippenham, UK.

Linderman, Michael et al., "Recognition of Handwriting from Electromyography", PLoS One, Aug. 2009, pp. 1-8, vol. 4, Issue 8.

De Luca, Carlo J., "Surface Electromyography: Detection and Recording", Introduction to Surface EMG, 2002, pp. 1-8, DelSys Incorporated.

De Luca, C. J., "The Use of Surface Electromyography in Biomechanics", Wartenweiler Memroial Lecture, The International Society for Biomechanics, Jul. 5, 1993, Introduction to Surface EMG, Reprinted 1997 from Journal of Applied Biomechanics, pp. 135-136, vol. 13, No. 2, DelSys Incorporated.

Werner, Perla et al., "Handwriting Process Variables Discriminating Mild Alzheimer's Disease and Mild Cognitive Impairment", Journal of Gerontology: Psychological Sciences, 2006, pp. 228-236, vol. 61B, No. 4, The Gerontology Society of America.

Rosenblum, Sara et al., "Automatic segmentation as a tool for examining the handwriting process of children with dysgraphic and proficient handwriting", Human Movement Science, 2005, pp. 608-621, vol. 25, Elsevier.

Klein Breteler, Mary D. et al., "Timing of Muscle Activation in a Hand Movement Sequence", Cerebral Cortex, Apr. 2007, pp. 803-815, vol. 17.

Khezri, Mandi, et al., "Real-time intelligent pattern recognition algorithm for surface EMG signals", BioMedical Engineering OnLine 2007, Dec. 3, 2007, 6:45.

Bitar, Fadi et al., "A Portable MIDI Controller Using EMG-Based Individual Finger Motion Classification", Biomedical Circuits and Systems Conference, 2007, Nov. 27-30, 2007, IEEE.

Kass, Robert E. et al, "Statistical Issues in the Analysis of Neuronal Data", Journal of Neurophysiology, Accepted for Publication Feb. 19, 2005, pp. 8-25, vol. 94, The American Physiological Society.

Beech, John R. et al, "Do differences in sex hormones affect handwriting style? Evidence from digit ratio and sex role identity as determinants of the sex of handwriting", Personality and Individual Differences, Mar. 23, 2005, pp. 459-468, vol. 39, Elsevier.

Linear regression, Wikipedia, http://en.wikipedia.org/wiki/Linear_regression, accessed Jan. 5, 2006, Wikipedia Foundation.

Artificial neural network, Wikipedia, http://en.wikipedia.org/wiki/Artificial_neural_network, accessed Jan. 5, 2006, Wikipedia Foundation.

Alizadeh-Taheri, Babak et al., "An Active Microfabricated, Scalp Electrode-Array for EEG Recording", The 8th International Conference of Solid-State Sensors and Actuators, and Eurosensors IX, Stockholm, Sweden, Jun. 25-29, 1995, pp. 67-70, vol. 9-A1.

Umer, Muhammad Fahad et al., "Classification of Textual Documents Using Learning Vector Quantization", Information Technology Journal, 2007, pp. 154-159, vol. 6, No. 1, Asian Network for Scientific Information.

Lebedev, Mikhail A. et al., "Brain-machine interfaces: past, present and future", Trends in Neurosciences, Jul. 21, 2006, pp. 536-546, vol. 29, No. 9, Elsevier.

Nicolelis, Miguel A. L. et al., "Simultaneous encoding of tactile information by three primate cortical areas", Nature Neuroscience, Nov. 1998, pp. 621-630, vol. 1, No. 7, Nature America Inc.

Kim, Hyun K. et al., "Continuous Shared Control for Stabilizing Reaching and Grasping With Brain-Machine Interfaces", IEEE Transactions on Biomedical Engineering, Jun. 2006, pp. 1164-1173, vol. 53, No. 6, IEEE.

Seifert, Heather M. et al., "Restoration of Movement Using Functional Electrical Stimulation and Bayes' Theorem", The Journal of Neuroscience, Nov. 1, 2002, 9465-9474, vol. 22, No. 21, Society for Neuroscience.

Rau, G, et al., "Principles of High-Spatial-Resolution Surface EMG (HSR-EMG): Single Motor Unit Detection and Application in the Diagnosis of Neuromuscular Disorders", Journal of Electromyography and Kinesiology, 1997, pp. 233-239, vol. 7, No. 4, Elsevier.

Naik, Ganesh R. et al., Hand gestures for HCI using ICA of EMG, HCSNet Workshop on the Use of Vision in HCI (VisHCI 2006), Canberra, Australia. Conferences in Research and Practice in Information Technology (CRPIT), Nov. 1-6, 2006, pp. 67-72, vol. 56, Australian Computer Society, Inc.

Griss, Patrick et al., "Micromachined Electrodes for Biopotential Measurements", Journal of Microelectromechanical Systems, Mar. 2001, pp. 10-16, vol. 10, No. 1, IEEE.

Mechtcheriakov, Sergei, et al., "Motor dysfunction in patients with liver cirrhosis; impairment of handwriting", Journal of Neurology (2006), Oct. 28, 2005, pp. 349-356, vol. 253.

Davies, Ronnie M., et al., "Measurement of Time-Dependent Changes in the Irregularity of Neural Spiking", Journal of Neurophysiology, Mar. 22, 2006, pp. 906-918, vol. 96, American Physiological Society.

Mavrogiorgou, P., et al., "Kinematic analysis of handwriting movements in patients with obsessive-compulsive disorder", Journal of Neurology, Neurosurgery & Psychology 2001, Accepted for publication Dec. 8, 2000, pp. 605-612, vol. 70, JNNP Online.

Domingos, Pedro, et al., "On the Optimality of the Simple Bayesian Classifier under Zero-One Loss", Machine Learning, 1997, pp. 103-130, vol. 29, Kluwer Academic Publishers, The Netherlands.

Hoffman, Klaus-Peter, et al., "Flexible dry surface-electrodes for ECG long-term monitoring", 29th Annual International Conference of the IEEE EMBS, Lyon, France, Aug. 23-27, 2007, pp. 5739-5742, IEEE.

\* cited by examiner

RECORDATION OF HANDWRITING AND HAND MOVEMENT USING ELECTROMYOGRAPHY

CROSS-REFERENCE TO RELATED APPLICATION

This application claims the benefit of U.S. Provisional Application No. 60/751,905, filed 21 Dec. 2005. The aforementioned provisional application's disclosure is incorporated herein by reference in its entirety.

BACKGROUND OF THE INVENTION

1. Field of the Invention

This invention relates to the use of electromyography (EMG) signals in electronic handwriting transcription.

2. Background

The prior art is rich in various systems and methods in the area of digital handwriting, as well as various systems and methods relating to useful endeavors. In general, most existing systems and methods provide concrete functions, which have a defined response to a defined stimulus. Such systems, while embodying the "wisdom" of the designer, have a particular shortcoming in that their capabilities are limited. The following is a description of some of these technologies.

Digital ink refers to technology that digitally represents handwriting in its natural form. In a typical digital ink system, a digitizer is laid under or over an LCD screen to create an electromagnetic field that can capture the movement of a special-purpose pen, or stylus, and record the movement on the LCD screen. The effect is like writing on paper with liquid ink. The recorded handwriting can then be saved as handwriting or converted to typewritten text using handwriting recognition technology.

Digital ink technology enables a user to write and draw on the touch-sensitive screen of a handheld PC or other writing tablet with a stylus or other pointing device, and for that information to be input into the computer, perhaps with some enhancements such as handwriting recognition or display. The technology provides a convenient means for applications to accept input from a user without using a keyboard. For a user, taking notes or drawing sketches using digital ink technology is a convenient way to enter text or other information into a computer without having to use a keyboard.

Most contemporary handwriting analyzers utilize a tablet computer and a stylus. A user writes on the tablet computer with the stylus, and coordinate, pressure, vector, and/or other information generated by the contact of the stylus with the tablet computer is utilized to recognize the writing strokes of the user. A problem with this system is that writing on a computer tablet does not feel the same as writing on paper. In addition, people prefer to write with more contemporary, ergonomic pens rather than with the thin stylus that is typically provided with a tablet computer.

A related technology provides an electronic module that inserts into or is otherwise associated with a pen or other writing instrument. The electronic module includes a mechanism for detecting pen motion, such as an accelerometer, and is preferably mounted in a cavity that is designed for a substitute ink cartridge for a pen. An accelerometer may be used to measure the relative acceleration and deceleration of the pen in the X and Y axes, which in turn may be used to provide a two-dimensional vector stream representing the pen's movement. Alternatively, the accelerometer may be arranged so that it senses tilt of the pen. In such a case, the information from the accelerometer may be used to plot relative X and Y components that represent the pen movements that are generated by a user.

Another example of similar technology is digital pen and paper technology, in which a digital pen writes on paper like any normal pen. The difference is that it captures everything the user writes. The pen can send what the user has written to a computer for storage and processing, or as an email or fax. Applications range from: removing the need to re-key forms, to automatically storing and indexing pages written in a notebook. The user can even send faxes and emails by simply writing them with a pen.

The digital pens include a tiny camera, some memory, a CPU and a communications unit. The paper is also special in that it needs to have an almost invisible dot pattern printed on it. The user could use a computer's printer to print this or get a specialist stationery printer to do it. Many paper products from 3M yellow Sticky Notes to Black n' Red Notebooks are already available with the pattern pre-printed on them. The pen senses the pattern and is thereby able to provide data as to where on the page the user is writing.

The disadvantage of tablet PC and PDA technologies is that it is not convenient for taking notes and drawing. The disadvantage of electronic pen and paper technology is that it requires special paper. The disadvantage of the accelerometer based technology is that it is not accurate and not reliable.

Using handwriting for taking notes and drawing is the most natural way of non-verbal communication. Hence, here is a demand for convenient ways to transfer handwriting into computers or cell phones.

Current methodologies, such as optical camera, ultra sound, and tablet technology, do not allow users to take full advantage of handwriting interfaces because they all require special pens. Optical cameras are not durable and need special paper. Ultra sound requires external device. An electronic tablet requires a computer, which takes away from the freedom of handwriting. A new approach is therefore needed for a convenient way to use digital handwriting products.

Digital pens based on optical camera technology use a tiny camera on the tip of the pen. It can write only on the specially designed paper. Users have to make a check mark in a special location, when they start, or stop writing. This type of pen uses special ink cartridge. Such optical cameras tend to break, when they are accidentally dropped. Users are not comfortable writing with special pens and on special paper.

Digital pens based on ultra sound technology transmit ultrasound to an external device that calculates the location of the pen. Again, the necessity to write only with a special pen and carry an external device makes this device inconvenient. Additionally, ultra sound technology is energy consuming, which imposes a limit on the paper size.

Electronic tablet technology requires using a special pen that writes on Tablet PC, or a special device that is connected to a computer. This technology is also not as convenient as traditional pen and paper.

SUMMARY

Handwriting activity is reconstructed in a digital format by applying computer algorithms directly to electromyography (EMG) signals. Pattern classification and recognition algorithms are used in conjunction with pattern recognition techniques. The recording is done through a data processing apparatus and routine, handwriting reconstruction routine, and a routine that generates machine editable text

BRIEF DESCRIPTION OF THE DRAWINGS

The features, nature, and advantages of the present invention will become more apparent from the detailed description

DETAILED DESCRIPTION OF THE INVENTION

Figure 1:
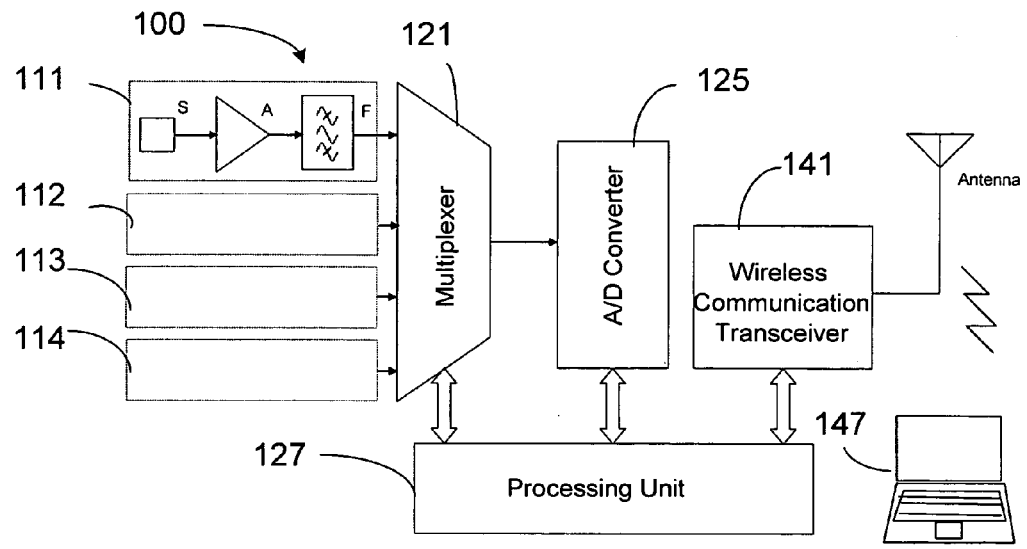
FIG. 1 is a schematic block diagram a circuit used to sense electromyographic (EMG) data and provide an output based on the sensed data.

The word "exemplary" is used herein to mean "serving as an example, instance, or illustration." Any embodiment described herein as "exemplary" is not necessarily to be construed as preferred or advantageous over other embodiments. The word "example" is used herein to mean "a non-limiting example." Each example provided herein is an illustration of merely one embodiment; many others may exist, and no provided example should be construed as limiting an otherwise broader category.

Overview

This invention relates to a biosensor that can read the biometric signals from the muscles of a hand, and/or a forearm, using electromyography (EMG). The second part of the device is handwriting recognition and extraction software. This software will process and interpret the biometric signals for the purposes of recreating the handwriting and/or drawing in a digitized form. The same software can be extended to process and interpret additional data related to an individual at the time when handwriting takes place. Therefore, the invention is a device and a method for handwriting recognition, digital recordation, storage, displaying, and communication system that may be extended to processing of additional related information. This instantaneous handwriting recording system may be combined with other forms of communication and data processing, and control such as phones (e.g. SMS messages), translators, telerobotics, games, etc.

This process incorporates a method, device, system for reading, interpreting, and processing the handwriting activity and drawing. This method is based on biometric signals. It is believed that biometric signals from muscles and other neural communications contain the most complete data pertaining to the writing activity. This data is used for interpretation with programming algorithm. The purpose of this handwriting recordation device is to record handwriting notes and drawing in real time. This recorded data may also be processed to translate the information into human readable format in the same device or elsewhere.

The system also includes handwriting and drawing recognition algorithm that will interpret said biometric signals. Another programming algorithm will process and translate the information. Said program will be capable of displaying the handwriting in a readable format for itself or passing it to a viewer or word processor. The program can also process the received information in any convenient manner.

In one general aspect, the invention incorporates an approach to record handwritten notes and drawing in real time, based on a biosensor that is reading the biometric signals from the muscles and/or neural communications. These biosensors may be located on a surface of a hand including fingers and/or a forearm. The biosensor based device is independent of an actual pen and the user can use any pen or pencil to write on any paper or just on a plain surface. The data processing unit and a memory chip for a biosensor maybe also located in an abbreviated glove, wristband, a watch, etc. The biosensor may also collect other biometric signals to be interpreted and combined with cell phone, and or other devices. The device may be independent from another electronic device that will be used to display the interpretation of biometric signals, in which case, the data can be transmitted to another device at a later time. Prior to transmission, the data may be stored and/or immediately transmitted to another electronic device, if needed. In addition, it is possible to incorporate some basic and/or more sophisticated displaying capabilities on a recording or storage device used for temporary storage of the biometric data.

This described technique uses the fact that EMG signals can be used to digitize handwriting and effectively creating the device to transfer the handwriting activity into a computer device. This technology allows for a mini glove to record hand movements while the users write or draw, using any pen and any paper. This recorded information may be stored locally in a memory chip and then transferred to a computer, or a cell phone.

The technique is implemented with pattern recognition algorithms that provide the correlation between the hand movements and EMG signals. In addition, it takes advantage of dry electrodes applied to skin locations through a mini glove. This invention will be used in consumer electronics, education, medicine, telerobotics, and many other fields, since EMG can be interpreted to reconstruct the movement of a hand, and or an arm, and or any body part in three dimensions.

The data mini glove for instantaneous handwriting recording uses three design principles:
  Pattern recognition algorithms
  Dry EMG electrodes
  EMG data acquisition system Pattern Recognition Algorithms A raw sensed output of EMG signals does not make any sense as interpretations of hand movement. It is only when one applies EMG interpretation algorithms that one is able to interpret the signals as a meaningful activity and find the correspondence with the fine grained hand movements. This is because there is no direct correspondence between sensed EMG of muscles and fine grained hand movements associated with the sensed EMG. Additionally, all muscles generate EMG signals, irrespective of whether their fingers are moving or not.

Pattern recognition aims to classify data (patterns) based on either an a priori knowledge or on statistical information extracted from the patterns. The patterns to be classified are usually groups of measurements or observations represented as data points in an appropriate multidimensional space.

A complete pattern recognition system consists of a sensor that gathers the observations to be classified or described; a feature extraction algorithm that computes numeric or symbolic information from the observations; and a classification or description scheme that does the actual job of classifying or describing observations, relying on the extracted features.

The classification or description scheme is usually based on the availability of a set of patterns that have already been classified or described. This set of patterns is termed the training set and the resulting learning strategy is characterized as supervised learning. Learning can also be unsupervised, in the sense that the system is not given an a priori labeling of patterns, instead it establishes the classes itself based on the statistical regularities of the patterns.

The classification or description scheme usually uses one of the following approaches: statistical (or decision theoretic), syntactic (or structural). Statistical pattern recognition is based on statistical characterizations of patterns, assuming that the patterns are generated by a probabilistic system. Structural pattern recognition is based on the structural interrelationships of features. A wide range of algorithms can be applied for pattern recognition, from very simple Bayesian classifiers to much more powerful neural networks. Further information is found in, Sergios Theodoridis, Konstantinos Koutroumbas, *Pattern Recognition* (3rd edition, 2006)

Multiple Linear Regression

In statistics, multiple linear regression is a regression method of modeling and predicting the conditional expected value of one variable y given the values of some other variable or variables x. Linear regression is called "linear" because the relation of the response to the explanatory variables is assumed to be a linear function of some parameters. It is often erroneously thought that the reason the technique is called "linear regression" is that the graph of $y=\alpha+\beta x$ is a line. In contrast, if the model is, by way of example:

$$y_i = \alpha + \beta x_i + \gamma x_i^2 + \epsilon_i$$

(in which case the vector $(x_i, x_i^2)$ is placed the role formerly played by $x_i$ and the vector $(\beta, \gamma)$ is placed in the role formerly played by $\beta$), then the problem is still one of linear regression, even though the graph is not a straight line.

Regression models which are not a linear function of the parameters are called nonlinear regression models (for example, a multi-layer artificial neural network).

More generally, regression may be viewed as a special case of density estimation. The joint distribution of the response and explanatory variables can be constructed from the conditional distribution of the response variable and the marginal distribution of the explanatory variables. In some problems, it is convenient to work in the other direction: from the joint distribution, the conditional distribution of the response variable can be derived. Regression lines can be extrapolated, where the line is extended to fit the model for values of the explanatory variables outside their original range. Further information is found in, http://en.wikipedia.org/wiki/Linear_regression (19 Dec. 2006).

Bayesian Classifier

Another pattern recognition model is called Bayesian classifier. This is a probabilistic classifier based on applying Bayes' theorem with strong independence assumptions. In spite of their naive design and apparently over-simplified assumptions, naive Bayesian classifiers often work much better in many complex real-world situations than might be expected. Recently, careful analysis of the Bayesian classification problem has shown that there are sound theoretical reasons for the seemingly unreasonable efficacy of naive Bayesian classifiers. Abstractly, the probability model for a classifier is a conditional model $$p(C|F_1, \ldots, F_n)$$

over a dependent class variable C with a small number of outcomes or classes, conditional on several feature variables $F_1$ through $F_n$. The problem is that if the number of features, n, is large or when a feature can take on a large number of values, then basing such a model on probability tables is infeasible and computationally demanding. The model is therefore reformulated to make it more tractable.

Using Bayes' theorem, we write $$p(C|F_1, \ldots, F_n) = \frac{p(C)p(F_1, \ldots, F_n|C)}{p(F_1, \ldots, F_n)}.$$

In practice we are only interested in the numerator of that fraction, since the denominator does not depend on C and the values of the features $F_i$ are given, so that the denominator is effectively constant. The numerator is equivalent to the joint probability model $$p(C, F_1, \ldots, F_n)$$

which can be rewritten as follows, using repeated applications of the definition of conditional probability:

$$p(C, F_1, \ldots, F_n) = p(C)p(F_1, \ldots, F_n | C)$$
$$= p(C)p(F_1 | C)p(F_2, \ldots, F_n | C, F_1)$$
$$= p(C)p(F_1 | C)p(F_2 | C, F_1)$$
$$\quad p(F_3, \ldots, F_n | C, F_1, F_2)$$
$$= p(C)p(F_1 | C)p(F_2 | C, F_1)p(F_3 | C, F_1, F_2)$$
$$\quad p(F_4, \ldots, F_n | C, F_1, F_2, F_3)$$

and so forth. Now the "naive" conditional independence assumptions come into play: assume that each feature $F_i$ is conditionally independent of every other feature $F_j$ for $j \neq i$. Therefore:

$$p(F_i | C, F_j) = p(F_i | C)$$

and so the joint model can be expressed as:

$$p(C, F_1, \ldots F_n) = p(C)p(F_1 | C)p(F_2 | C)p(F_3 | C)\ldots$$
$$= p(C)\prod_{i=1}^{n} p(F_i | C).$$

Under the above independence assumptions, the conditional distribution over the class variable C can be expressed according to:

$$p(C | F_1, \ldots, F_n) = \frac{1}{Z} p(C) \prod_{i=1}^{n} p(F_i | C)$$

where Z is a scaling factor dependent only on $F_1, \ldots, F_n$, i.e., a constant if the values of the feature variables are known.

Models of this form are much more manageable, since they factor into a so-called class prior p(C) and independent probability distributions $p(F_i|C)$. If there are k classes and if a model for $p(F_i)$ can be expressed in terms of r parameters, then the corresponding naive Bayes model has (k−1)+n r k parameters. In practice, often k=2 (binary classification) and r=1 (Bernoulli variables as features) are common, and so the total number of parameters of the naive Bayes model is 2n+1, where n is the number of binary features used for prediction. Further information is found in, Domingos, Pedro & Michael Pazzani, "On the optimality of the simple Bayesian classifier under zero-one loss". *Machine Learning*, 29:103-137, (1997).

Despite the fact that the far-reaching independence assumptions are often inaccurate, the naive Bayesian classifier has several properties that make it very useful in practical applications. In particular, the decoupling of the class conditional feature distributions means that each distribution can be independently estimated as a one dimensional distribution. This in turn helps to alleviate problems stemming from the curse of dimensionality, such as the data sets that scale exponentially with the number of features. Like all probabilistic classifiers under the MAP decision rule, it arrives at the correct classification as long as the correct class is more probable than any other class; hence class probabilities do not have to be estimated very well. Thus, the overall classifier is robust enough to cope with the deficiencies in its underlying naive probability model. Further information is found in, Hand, DJ, & Yu, K. "Idiot's Bayes—not so stupid after all?" *International Statistical Review*, Vol 69 part 3, (2001), pages 385-399.

Artificial Neural Network

An artificial neural network (ANN), such as Time Lagged Recurrent Network (TLRN) or commonly just neural network (NN) is an interconnected group of artificial neurons that uses a mathematical model or computational model for information processing based on a connectionist approach to computation. In most cases an ANN is an adaptive system that changes its structure based on external or internal information that flows through the network. (The term "neural network" can also mean biological-type systems.)

In more practical terms neural networks are non-linear statistical data modeling tools. They can be used to model complex relationships between inputs and outputs or to find patterns in data. Further information is found in, http://en.wikipedia.org/wiki/Artificial_neural_network (19 Dec. 2006).

There is considerable overlap between the fields of neural networks and statistics. Statistics is concerned with data analysis. In neural network terminology, statistical inference means learning to generalize from noisy data. Some neural networks are not concerned with data analysis (e.g., those intended to model biological systems) and therefore have little to do with statistics. Some neural networks do not learn (e.g., Hopfield nets) and therefore have little to do with statistics. Some neural networks can learn successfully only from noise-free data (e.g., ART or the perceptron rule) and therefore would not be considered statistical methods. Most neural networks that can learn to generalize effectively from noisy data have at least some similarity in technique with statistical methods.

Hardware Implementation

FIG. 1 is a diagram illustrating dexemplary circuit 100 used to sense electromyographic (EMG) data and provide an output based on the sensed data. The circuit 100 detects biometric signals obtained from sensing stimulation of muscles. It can be seen that these signals are distinct and not chaotic. There is a correlation between the muscle activities and movements of fingers, hand, and arm via programming algorithms, e.g., pattern recognition. The special pattern recognition algorithms are required, because the said correlation is not direct. The handwriting recordation device will contain the biosensor that may be in a form of MEMS system as it should be very small. A biosensor also can be an electrode for recording Electromiography (EMG) signals. This sensor may have an amplifier to increase the signal to noise ratio. The device will have a way to store the data after its read and/or to transmit the data to where it will be processed for interpretation and/or displayed. Intermediate systems may also be included for other purposes.

Figure 2:
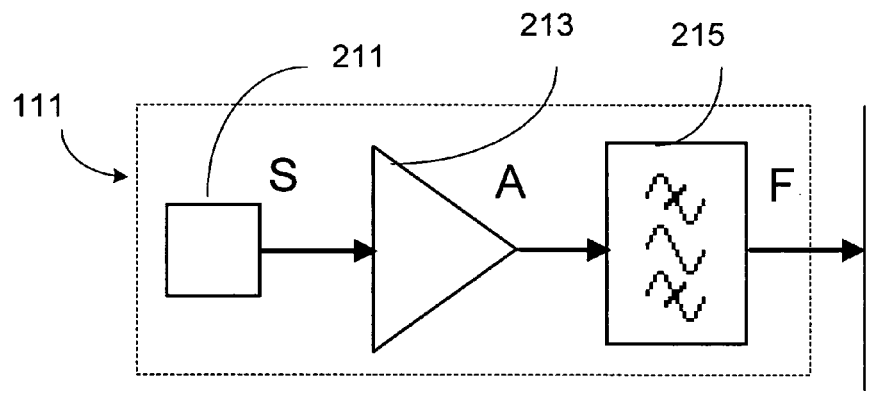
FIG. 2 is a diagram showing details of one of the sensor circuits of FIG. 1.

Depicted in FIG. 1 is a plurality of sensor circuits 111, 112, 113, 114, a multiplexer 121, an analog-to-digital converter 125, and a processing unit 127. Also depicted is a wireless communication transceiver which can communicate with an external computer 147. FIG. 2 is a diagram showing details of one of the sensor circuits 111 depicted in FIG. 1. The sensor unit includes a sensor electrode 211, an amplifier 213 and an output filter 215.

Figure 3:
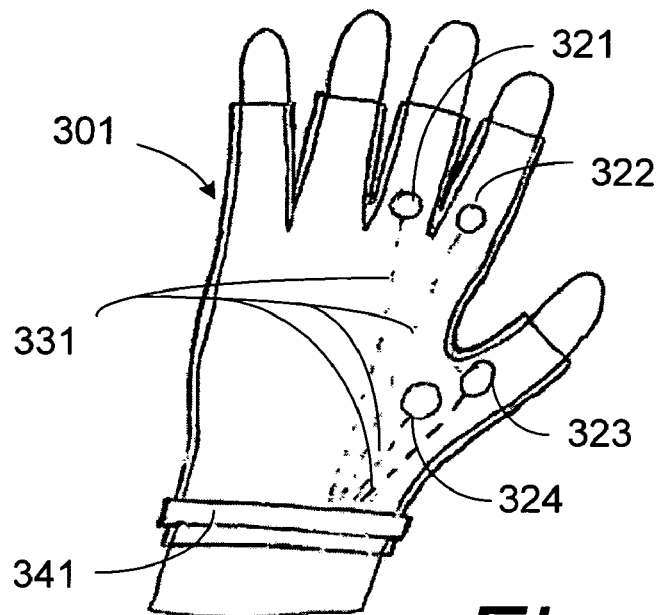
FIG. 3 is a diagram showing an example of a user interface garment and FIG. 4 is a diagram depicting an implemental of one system to record handwriting activity.

FIG. 3 is a diagram showing an example of a user interface garment 301. The garment can be in the form of a lightweight glove or "mini glove", such as the "fingerless glove" depicted. The glove has attached thereto a set of sensing electrodes 321-324, and a corresponding set of electrical connections 331-334. The electrical connections are connected to a processing module 341, which includes the circuitry depicted in FIG. 1.

It is understood that the specific structure of the glove is not part of the invention. It is also possible to provide any convenient form of attachment for the electrodes, not limited to a glove-like structure. It is further possible to mount one or more of the sensing electrodes 321-324 to parts of the body separate from the hand (e.g., on the arm), and it is possible to mount one or more of the sensing electrodes 321-324 separate from the glove. The use of 4 electrodes is presented as an example, for clarity of the drawings and does not represent the expectations of actual construction.

The components of the sensors can be combined as a chipset which includes one or more monolithic integrated circuit chips. Referring to FIG. 1, such a chipset can include one or more of the multiplexer 121, analog-to-digital converter 125, processing unit 127 and wireless communication transceiver. The chipset can further include one or more components of the sensors 111-114, such as amplifier 213 and output filter 215. Similarly, the components of the sensors 111-114 such as sensor electrode 211, amplifier 213 and output filter 215 can be integrated. It is also possible to integrate components associated with the external computer 147 into the chipset. FIG. 2 is a diagram showing details of one of the sensor circuits 111 depicted in FIG. 1. The sensor unit includes a sensor electrode 211, an amplifier 213 and an output filter 215.

Dry EMG Electrodes

Electrodes for measuring biopotentials are extensively used in modem clinical and biomedical applications. These applications include numerous physiological tests including electrocardiography (ECG), electroencephalography (EEG), electrical impedance tomography (EIT), electromyography (EMG) and electro-oculography (EOG). The electrodes for these types of physiological tests function as a transducer by transforming the electrical potentials or biopotentials within the body into an electric voltage that can be measured by conventional measurement and recording devices.

In general, most commercial physiological electrodes for these applications today are placed on the surface of the skin. Because of such use, it is important to understand the anatomy of the skin to address the problems encountered with these electrodes. The skin is a layered structure, which consists of the epidermis and the dermis. The dermis contains the vascular and nervous components. Further it is the part of the skin where pain has its origins. The epidermis is the most important layer in the electrode/skin interface. The epidermis consists of a number of layers. These layers consist of:

a) Stratum basale or stratum germinativum, which contains living basal cells, that grow and divide, eventually migrating into the other layers of the epidermis;

b) Stratum spinosum, which contains living cells that have migrated from the stratum basale. The early stages of desmosomes can be found in this layer;

c) Stratum granulosum, which contains cells with many desmosomal connections, forms a waterproof barrier that prevents fluid loss from the body;

d) Stratum lucidum, which is a transition layer between the stratum granulosum and the stratum corneum. It is thickest in high friction areas such as the palms and the soles of the feet; and e) Stratum corneum, which is the outer layer, contains dry, dead cells, flattened to form a relatively continuous thin outer membrane of relatively continuous thin outer membrane of skin. The deeper cells of this layer still retain the desmosomal connections, but as they are pushed toward the surface by newly formed cells in the underlying layers, the junctions gradually break and the cells are lost.

The stratum corneum is the primary source of high electrical impedance. This is because dead tissue has different electrical characteristics from live tissue, and has much higher electrical impedance. Thus, this layer dramatically influences the biopotential measurements. The stratum corneum is estimated to be approximately one tenth the thickness of the epidermis except for the palms of the hand and the foot where this layer is much thicker. The stratum corneum, further, is very thin and uniform in most regions of the body surface ranging from 13 15 .mu.m with a maximum of about 20 .mu.m. If the high impedance results from the stratum corneum can be reduced, a more stable electrode will result. Therefore with existing physiological electrodes the skin are prepared prior to application when lower impedance is required.

Use of Alternative Electrodes Possible

The most common electrode preparation methods that cope with the high impedance effects of the stratum corneum are: 1) shaving the hair from the skin; and either 2a) abrading the stratum corneum or 2b) using an electrolytic gel. The use of an electrolytic gel or fluid is often referred to as "wet" electrodes. Hair is shaved from the skin to improve the contact between the electrodes and the skin surface. The goal of the abrasion of the stratum corneum is to reduce the thickness of (or remove) the stratum corneum (and therefore its electrically insulating characteristics). Drawbacks of abrading the skin are that the abraded area regenerates dead cells fairly quickly (resulting in a limited time period for using the electrode), and if the abrasion is too deep the person can experience pain. Additionally, electrolytic gels or fluids may be applied to abraded surface to enhance the contact. Alternatively, electrolytic gels or fluids can be applied to the surface of the skin directly. The electrolytic gel having a high concentration of conductive ions diffuses into the stratum corneum and improves its conductivity. Drawbacks observed with the use of electrolytic gels or fluids involve the change of conductivity with time as the gels dry, discomfort (an itching sensation) at the patients skin as a result of the gels drying, and the possibility of a rash due to an allergic reaction to the electrolytic gels.

In addition to the inconvenience of "wet: electrodes, "wet" electrodes have other disadvantages. These include the need for skin preparation and stabilization of the electrode with respect to the skin surface. This is because movement of the electrode on the surface of the skin causes the thickness of the electrolytic layer (formed by the electrolytic gels or fluids) to change resulting in false variation in the measured biopotential. Some electrode designs have an adhesive backing and/or grated surfaces to reduce the movement of the electrode on the skin surface, however, neither of these features eliminates completely the movement of the electrode with respect to the subject's skin. Another drawback is the length of time required to prepare the skin and apply the electrolytic gels or fluids prior to measurement of the biopotentials. Nevertheless, it is possible to use "wet" electrodes for sensing hand movement.

A less common type of physiological electrode is a non-polarizable "dry" electrode. These ceramic, high sodium ion conducting electrodes do not need an electrolytic gel before their application. The recordings using these physiological electrodes are based on a sodium ion exchange between the skin and the electrode. The skin-electrode impedance of these type of electrodes are found to decrease as a function of application time. This is a result of perspiration being produced by the body under the electrode almost immediately after application of the electrode on the skin. Drawbacks, however, are similar to those of "wet" electrodes.

Another less common type of physiological electrode is an active "dry" electrode with an amplifier. Advances in solid-state electronic technology have made it possible to record surface biopotentials utilizing electrodes that can be applied directly to the skin without abrading the skin or using an electrolytic gel. These electrodes are not based on an electrochemical electrode-electrolyte interface. Rather, these electrodes are active and contain a very high impedance-converting amplifier. Some claim that by incorporating the high impedance-converting amplifier into the electrode, biopotentials can be detected with minimal or no distortion. Further information is found in, Babhk Alizadeh-Taheri et al., *An Active Microfabricated Scalp Electrode Array for EEG Recording Sensors and Actuators*, A54, pp. 606-611, Elsevier Science, S.A. (1996); in, Edward D. Flinn, "Ouch-less Injections", *Popular Science*, October 1998, p. 33 United States; in, Patrick Griss et al., "Micromachined Electrodes for Biopotential Measurements", *Journal of Microelectromechanical Systems*, March 2001, pp. 10-16, vol. 10.

EMG Data Acquisition System

Electromyography (EMG) is an electrophysiological technique for evaluating and recording physiological properties of muscles at rest and while contracting. EMG is performed using a device called an electromyograph, to produce a record called an electromyogram. An electromyograph detects the electrical potential generated by muscle cells when these cells contract, and also when the cells are at rest. The electrical source is the muscle membrane potential, about −70 mV. Due to the applied method the resulting measured potentials range between smaller than 50 µV and 20 to 30 mV. Amplitudes of EMG signal range between 0 to 10 mV (peak-to-peak), or 0 to 1.5 mV (rms). Frequency of EMG signal is between 0 to 500 Hz. The usable energy of EMG signal is dominant between 50-150 Hz.

EMG data are routinely acquired in clinical and laboratory settings. The details of these procedures can be found in the works of Carlo Deluca, among others. Further information is found in, De Luca, C. J. *Electromyography*; and in, *Encyclopedia of Medical Devices and Instrumentation*, (John G. Webster, Ed.) John Wiley Publisher, 98-109 (2006).

The following factors should be considered: actors to be considered:

Boost signal to TTL standard level (±5 V.), Noise/Artifact problem, Filter, stability of electrodes attached to skin, proper grounding, DC offset or bias problem that requires Bias adjustment.

The following are EMG measurement stages:

Hand−>Preamplifier−>RC Filter−>Amplifier with Bias Adjustment−>A/D Converter−>EMG Capture Program.

Analyses of EMG Modulations and Interactions

Reconstruction of handwriting patterns from the EMGs may be conducted in two steps. During the first step an appropriate mathematical algorithm was trained. This training involved adjusting the algorithm parameters. This step is often referred to as "fitting". During the second step, the parameters of the algorithm were fixed, and predictions were produced from a new segment of EMG records.

Some attempts to reconstructions of behavioral variables from muscle activity were described in, Lebedev M A, Nicolelis M A., "Brain-Machine Interfaces: Past, Present and Future", *Trends Neurosci.* 2006 September;29(9):536-46. Epub Jul. 21, 2006 *Review*. The performance of the linear model: that predicts the parameters of interest as a weighted linear combination of input signals:

$$V(t)=b+\Sigma_{\tau=-m}{}^{n}w(\tau)n(t+\tau)+\epsilon(t)$$

where n(t+τ) is a vector of input signals (EMG), at time t and time-lag τ (negative lags correspond to past events), V is the parameter of interest at time t, w(τ) is a vector of weights for each input at time-lag τ, b is the y-intercept, and ε(t) is the residual error. This equation is solved using linear least squares regression.

To obtain predictions, EMG signals will be full-wave rectified and band-pass filtered in the range of 0.2-20 Hz. A sample number of time lags with temporary time spacing are used, for example 10 time-lags preceding the measurement with temporally spaced at 20-100 ms. The quality of predictions obtained using the EMGs of different muscles will be evaluated by calculating predictions for individual muscles and several muscles in different combinations. 5-10 minutes of data will be used to fit the model and find the weights, w(τ).

The X and Y coordinates of the pen are first predicted and fit to the pen while the subjects make handnotes. Predictions will be calculated for a different 5-10 minute epoch. The quality of predictions will be evaluated as the eucledian distance between the actual and predicted traces of the pen. Further information is found in, Kim H K, Biggs S J, Schloerb D W, Carmena J M, Lebedev M A, Nicolelis M A, Srinivasan M A., "Continuous Shared Control for Stabilizing Reaching and Grasping with Brain-Machine Interfaces", *IEEE Trans Biomed Eng.* 2006 June;53(6):1164-73.

As discussed, other pattern recognition computer algorithms may also be applied in any combination.

Further Sensed Data

The human hand is a complex system, with the large number of degrees of freedom, somatosensory receptors embedded in its structure, actuators and tendons, and a complex hierarchical control. Despite this complexity, the user can carry out the different movements virtually effortlessly (after an appropriate and lengthy training). Scientists and engineers made a lot of effort to replicate a sensory-motor function of the human hand, a complex and adaptive system capable of both delicate and precise manipulation and power grasping of heavy objects. Most of these efforts were spent in the area of prosthetic devices and rehabilitation techniques. These efforts led to much greater understanding of general EMG applications. Further information is found in, M. Zecca, S. Micera, M. C. Carrozza, & P. Dario, "Control of Multifunctional Prosthetic Hands by Processing the Electromyographic Signal", *Critical Reviews in Biomedical Engineering*, 30(4-6):459-485 (2002).

Fundamental insights into how arrays of neurons encode motor or sensory variables can be gained from computational methods that attempt to reconstruct or predict aspects of animal behavior or sensory stimuli from the recorded activity of neural populations. The accuracy with which a behavior such as the direction of limb movement or the path of an animal navigating a maze can be reconstructed provides an estimate of the amount of behaviorally relevant information represented in the discharge of the recorded neurons. It should also be possible to invert this process to predict neural activity from behavior. One application of such an approach would be to identify the patterns of neuromuscular activity across a population of muscles needed to elicit desired movements in paralyzed individuals using functional electrical stimulation. Further information is found in, Robert E. Kass, Valérie Ventura and Emery N. Brown, "Statistical Issues in the Analysis of Neuronal Data", *J Neurophysiol* 94:8-25, 2005. doi:10.1152/jn.00648.2004; in, R. M. Davies, G. L. Gerstein and S. N. Baker, "Measurement of Time-Dependent Changes in the Irregularity of Neural Spiking", *J Neurophysiol*, Aug. 1, 2006; 96 (2): 906-918; in, Robert E. Kass, Valérie Ventura, and Emery N. Brown, "Statistical Issues in the Analysis of Neuronal Data", *J Neurophysiol* 94: 8-25, 2005; doi:10.1152/jn.00648.2004; and in, Nicolelis M A L, Ghazanfar A A, Stambaugh C R, Oliveira L M O, Laubach M, Chapin J K, Nelson R J, Kaas J H, "Simultaneous Encoding of Tactile Information by Three Primate Cortical Areas", *Nat Neurosci* 1:621-630 (1998).

Functional electrical stimulation involves artificial activation of paralyzed muscles with electrodes and has been used successfully to improve the ability of quadriplegics to perform activities for daily living. The range of motor behaviors that can be generated by functional electrical stimulation, however, is limited to a relatively small set of movements, such as hand grasp and lateral and palmer pinch. A broader range of movements has not been implemented primarily because of the substantial challenge associated with identification of the patterns of muscle stimulation needed to elicit specified movements. Most limb movements, even those involving a single digit, require intricate coordination among multiple muscles that act across several joints. Such complex mechanical systems do not readily lend themselves to deterministic solutions. Although EMG signals recorded from able-bodied subjects can be used to identify patterns of muscle activity associated with a particular movement, this painstaking method yields control signals appropriate only for the motor task from which the EMG signals were originally recorded. In an attempt to overcome this limitation it is possible to use a probabilistic method called Bayes' theorem to predict the patterns of muscle stimulation needed to produce, in theory, an unlimited set of movements across multiple joints. The bidirectionality of Bayes' theorem facilitated the inverse prediction of neuromuscular activity from behavior. Further information is found in, Heather M. Seifert and Andrew J. Fuglevand, "Restoration of Movement Using Functional Electrical Stimulation and Bayes' Theorem", *The Journal of Neuroscience*, Nov. 1, 2002, 22(21):9465-9474.

Functional Implementation

Figure 4:
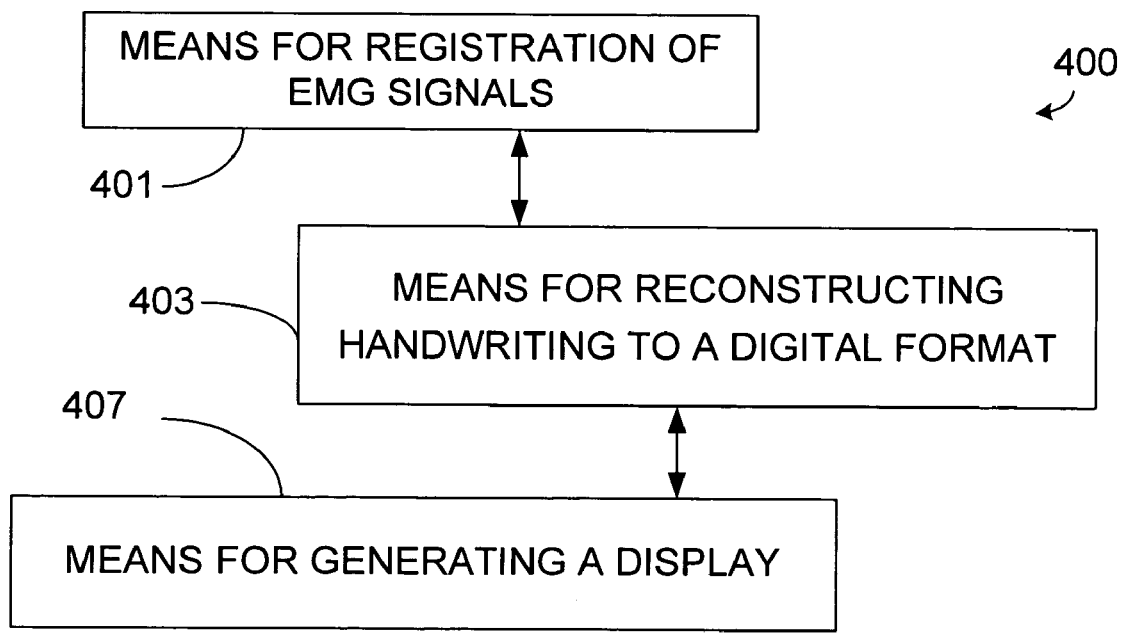

FIG. 4 is a diagram depicting a functional implementation of a system 400 to record a handwriting activity. The system includes means 401 for registration of electromyography (EMG) signals from one or more muscles at selected locations, which may include the sensors 111-114 (FIG. 1) as well as the remaining components of the circuit 100 used to sense EMG data. The means 401 for registration of EMG signals may comprise sensors, electrodes, amplifiers, bandpass filters, multiplexer, analog to digital converter, processing unit, and the means for registration of EMG signals may provide a routine to improve signal to noise ratio. Also included are means 403 for reconstructing handwriting to a digital format from said EMG signals, depicted as computer 147 (FIG. 1), although some or all of these functions can be provided by processor 127. The digital format includes both a visual representation of the reconstructed handwriting and a digitized rendition, such as text. The system 400 includes means 407 for generating a display corresponding to the digital format, depicted as computer 147 (FIG. 1).

The means 403, 407 for reconstructing and for generating a display corresponding to the digital format can generate a display of machine-editable text corresponding to the digital format and in the case of a drawing generate the drawing in an editable format.

Some configurations enhance the interaction of sensed EMG signals with creation of handwriting images and computer recognition of handwriting. There are various modifications that can be made, including using the EMG signals directly in the recognition of handwriting, "training" and "learning" of a computer application for recognition of handwriting, and the use of shorthand/or shortcuts for transcription purposes.

A machine-readable medium includes any mechanism that provides (i.e., stores and/or transmits information in a form readable by a machine (e.g., a computer). For example, a machine-readable medium includes, but is not limited to, read only memory (ROM); random access memory (RAM); magnetic disk storage media; optical storage medial; flash memory devices; electrical, optical, acoustical or other form of propagated signals (e.g., carrier waves, infrared signals, digital signals, etc.); storage media; radio channels; and wireless channels and various other mediums capable of storing, containing, or carrying instructions and/or data.

The previous description of some embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Further, one or more of the embodiments can be implemented by hardware, software, firmware, middleware, microcode, or any combination thereof. Thus, the present invention is not intended to be limited to the embodiments shown herein but is to be accorded the widest scope consistent with the principles and novel features disclosed herein.

Having described the invention in detail and by reference to the embodiments thereof, it will be apparent that modifications and variations are possible, including the addition of elements or the rearrangement or combination or one or more elements, without departing from the scope of the invention which is defined in the appended claims.

The invention claimed is:

1. A method to record handwriting activity, comprising:
registering electromyography (EMG) signals from one or more muscles at selected locations proximate the hand during handwriting activity;
wherein the EMG signals are full-wave rectified and band-pass filtered in the range of 0.2-20 HZ;
correlating the EMG signals with hand movement activity;
processing and storing said EMG signals in a memory for the purposes of handwriting recording;
analyzing said EMG signals and providing an output in a digital format; and
generating and providing an output of a correlation between the hand movements during handwriting and the EMG signals;
wherein one or more EMG sensor electrodes are configured to be disposed on a user's hand;
wherein the EMG sensors are dry sensors;
wherein the EMG signals are sampled at a number of time lags with temporary time spacing between samples from several hand muscles and in different combinations;
wherein a pattern recognition algorithm consisting of a mathematical algorithm is trained to reconstruct handwriting patterns from the EMG signals;
wherein the mathematical algorithm is expressed by the equation $V(t)=b+\Sigma_{\tau=m}^{n} w(\tau)n(t+\tau)+\epsilon(t)$;
wherein $n(t+\tau)$ is a vector of input EMG signals at time t and time lag $\tau$;
V is the parameter of interest at time t;
$w(\tau)$ is a vector of weights for each input at time lag $\tau$;
b is the y-intercept;
$\epsilon(t)$ is the residual error;
wherein the equation is solved using linear least square regression;
and wherein the algorithm is trained by adiusting the parameters of the equation until handwriting patterns are reconstructed from the EMG signals.

2. Non-transitory-machine readable digital media including instructions for the steps as set forth in claim 1.

3. A system to record handwriting activity, comprising:
means for registration of electromyography (EMG) signals from one or more muscles at selected locations proximate the hand during handwriting activity;
means for correlating the EMG signals with hand movement activity; wherein the EMG signals are full-wave rectified and band-pass filtered in the range of 0.2-20 HZ; means for providing a digital output of a reconstruction of the EMG signals, the output selected from the group consisting of a digital representation of handwritten text, machine editable text, a drawing, and a digital correlation output; and means for generating a display corresponding to the digital output;
wherein one or more EMG sensor electrodes are configured to be disposed on a user's hand;
wherein the EMG sensors are dry sensors;
wherein the EMG signals are sampled at a number of time lags with temporary time spacing between samples from several hand muscles and in different combinations;
wherein a pattern recognition algorithm consisting of a mathematical algorithm is trained to reconstruct handwriting patterns from the EMG signals;
wherein the mathematical algorithm is expressed by the equation $V(t)=b+\Sigma_{\tau=m}^{n} w(\tau)n(t+\tau)+\epsilon(t)$;
wherein $n(t+\tau)$ is a vector of input EMG signals at time t and time lag $\tau$;
V is the parameter of interest at time t;
$w(\tau)$ is a vector of weights for each input at time lag $\tau$;
b is the y-intercept;
$\epsilon(t)$ is the residual error;
wherein the equation is solved using linear least square regression;
and wherein the algorithm is trained by adiusting the parameters of the equation until handwriting patterns are reconstructed from the EMG signals.

4. The system of claim 3 wherein said means for generating a display corresponding to the digital output generates a display of machine-editable text corresponding to the digital output and in the case of a drawing generates the drawing in an editable format.

5. The system of claim 3 wherein:
the means for registration of EMG signals comprises at least one sensor, electrode, amplifier, bandpass filter, multiplexer, analog to digital converter, and processing unit; and
the means for registration of EMG signals includes a routine to improve signal to noise ratio.

6. The system of claim 5 wherein the processing unit includes data processing equipment including a central processing unit and a memory unit suitable for data processing.

7. The system of claim 3 comprising a glove, watch, wristband or similar article of apparel for housing the means for registration, processing, and storing of EMG signals to record the handwriting activity.

8. The system of claim 3 wherein the means for registration comprises a processor provided as a chipset including at least one monolithic integrated circuit, the processor executing a routine that reconstructs the EMG signals.

9. A handwriting digital reconstruction system, comprising:
- a plurality of electromyography (EMG) sensors configured to be disposed proximate a user's hand during handwriting activity, each sensor being configured to transmit a signal representative of a physiological property of the user;
- a processor;
- a pattern recognition program operable by the processor to correlate signals representative of a physiological property of the user with hand movement activity of the user; and
- data storage means storing program instructions that, when implemented by the processor, are configured to provide a digital representation of the user's handwriting based on EMG signals transmitted during the handwriting activity;
- wherein the EMG signals are full-wave rectified and band-pass filtered in the range of 0.2-20 HZ;
- wherein one or more EMG sensor electrodes are configured to be disposed on a user's hand;
- wherein the EMG sensors are dry sensors;
- wherein the EMG signals are sampled at a number of time lags with temporary time spacing between samples from several hand muscles and in different combinations;
- wherein a pattern recognition algorithm consisting of a mathematical algorithm is trained to reconstruct handwriting patterns from the EMG signals;
- wherein the mathematical algorithm is expressed by the equation $V(t)=b+\Sigma_{\tau=m} w(\tau) n(t+\tau) + \epsilon(t)$;
- wherein $n(t+\tau)$ is a vector of input EMG signals at time t and time lag $\tau$;
- V is the parameter of interest at time t;
- $w(\tau)$ is a vector of weights for each input at time lag $\epsilon$;
- b is the y-intercept;
- $\epsilon(t)$ is the residual error;
- wherein the equation is solved using linear least square regression;
- and wherein the algorithm is trained by adjusting the parameters of the equation until handwriting patterns are reconstructed from the EMG signals.

10. The method of claim 1 wherein the EMG signals are registered with in a glove, watch, wristband or similar article of apparel for housing the means for registration, processing, and storing of EMG signals to record the handwriting activity.

11. The system of claim 9 wherein the plurality of electromyography (EMG) sensors configured to be disposed proximate a user's hand by means of a glove, watch, wristband or similar article of apparel for housing the means for registration, processing, and storing of EMG signals to record the handwriting activity.

* * * * *